United States Patent [19]

Boydston

[11] 4,253,296
[45] Mar. 3, 1981

[54] APPARATUS AND METHOD FOR CONTROLLING THE GROWTH OF UNWANTED PLANTS

[76] Inventor: N. Howard Boydston, Dearborn, Mo. 64439

[21] Appl. No.: 50,822

[22] Filed: Jun. 21, 1979

[51] Int. Cl.³ .................. A01D 23/00; A01D 55/02
[52] U.S. Cl. .................................... 56/238; 56/15.9
[58] Field of Search ............. 56/13.7, 15.9, 208, 56/10.2, 14.9, 6, 257, 258, 192, 238, 121.4, 121.46

[56] References Cited

U.S. PATENT DOCUMENTS

| | | | |
|---|---|---|---|
| 2,629,219 | 2/1953 | Hooley | 56/15.9 |
| 2,651,907 | 9/1953 | Sclueter | 56/257 |
| 2,672,171 | 3/1954 | Jones | 143/43 |
| 2,680,946 | 6/1954 | Rousey | 56/15.9 |
| 2,706,882 | 4/1955 | Thornton et al. | 56/238 |
| 2,746,230 | 5/1956 | Reimer | 56/257 |
| 3,074,221 | 1/1963 | Martins | 56/17.6 |
| 3,113,411 | 12/1963 | Hall | 56/15.7 |
| 3,115,741 | 12/1963 | Robinson | 56/6 |
| 3,425,197 | 2/1969 | Kita | 56/10.2 |
| 3,623,304 | 11/1971 | Molzahn | 56/208 |
| 3,857,225 | 12/1974 | Knudson | 56/15.9 |
| 3,906,710 | 9/1975 | Pask | 56/10.2 |
| 4,126,989 | 11/1978 | Oosterling et al. | 56/6 |
| 4,133,404 | 1/1979 | Griffin | 56/10.2 |

FOREIGN PATENT DOCUMENTS 1782238  7/1971  Fed. Rep. of Germany ............ 56/13.7

Primary Examiner—Paul J. Hirsch
Attorney, Agent, or Firm—Fishburn, Gold and Litman

[57] ABSTRACT

An apparatus and method for controlling the growth of unwanted plants, such as weeds, volunteer plants, and the like, which project upwardly from a cultivated crop growing in a field, comprises providing an agricultural vehicle having a cutting bar thereon. The cutting bar is positioned at an elevation slightly above the uppermost portion of the crop, and the agricultural vehicle is piloted over the field, thereby cutting the upwardly projecting portions of the unwanted plants at a point thereon slightly above the uppermost portion of the crop, thereby arresting the growth of the unwanted plants, and facilitating the mechanical harvesting of the crop.

7 Claims, 3 Drawing Figures

APPARATUS AND METHOD FOR CONTROLLING THE GROWTH OF UNWANTED PLANTS

BACKGROUND OF THE INVENTION

The present invention relates to the art of agriculture, and in particular, to an apparatus and method for controlling the growth of unwanted plants in a cultivated crop.

In the field of agriculture, the problems associated with the uncontrolled growth of unwanted plants, such as weeds, volunteer plants, and the like, are well known. With respect to volunteer plants, the type of crop which is planted and grown in a particular field often changes from one growing season to the next in accordance with the farmer's desire yield, the desired crop rotation, weather conditions, and other similar factors. The rotation of the type of crop raised on the same plot of land typically results in the growth of volunteer plants, which grow as unwanted vegetation in the crop then being cultivated. Volunteer plants, like weeds, not only retard the growth of the cultivated crop, but also can cause substantial difficulties in the harvesting of the same, and reduce the unit price which the grower receives for the crop. The above noted problems are particularly exacerbated in those instances wherein the unwanted plants are relatively large, stalky plants, such as corn, milo, alfa, or the like, and/or bear a large fruit, as compared to the cultivated crop in which the volunteer plants are growing. This is especially true where the cultivated crop is a low profile crop, such as soybeans which grows fairly close to the ground and bears a small fruit.

Mechanical harvesting equipment is typically designed to process a certain type or group of crops which have similar physical characteristics. When such equipment encounters a type of plant which is quite dissimilar to the type of plant the device was designed to harvest, and attempts to process the same, substantial damage can result to the harvester. For example, a soybean harvester can become clogged and stall when it encounters large fully developed stalky plants, such as corn or milo. These unwanted plants which are processed by the harvester, serve to reduce the per bushel price which the farmer receives for the crop.

Not only do such large, unwanted plants retard the growth of the cultivated crop, lower the value of the harvested crop, and impede the mechanical harvesting thereof, but it is particularly difficult to effectively control the growth of such plants. The use of commercially available herbicides often do not effectively control the growth of volunteer plants, and the same thereafter present a particularly vexing problem. Further, the heavy use of herbicides in the control of unwanted plants can effect the wholesomeness and/or taste of the goods produced from the treated plants, thereby effecting their desirability for consumption. The problems associated with the use of some chemicals in the production of crops are clearly manifested by the existence of governmental agencies which constantly monitor such activities, as well as certain sects of consumers who profess eating only those foods which have been organically grown.

SUMMARY OF THE INVENTION

The principal objects of the present invention are: to provide an apparatus and method for controlling the growth of unwanted plants which project upwardly of a cultivated crop growing in a field; to provide such a method of plant control for organically grown crops; to provide such a method which does not retard the growth of the cultivated plants; to provide such a method which does not impair the quality, wholesomeness, or taste of the produce; to provide such a method which quickly arrests the growth of the unwanted plants and facilitates mechanical harvesting of the crops; to provide such a method which includes traversing a power cutter over the crop and cutting each of the unwanted plants at a point thereon slightly above the uppermost portion of the crop; to provide such a method wherein the unwanted plants comprise volunteer plants; to provide such a method wherein the crop comprises a low profile plant; to provide such an apparatus having an articulated frame for adjustably supporting an elongate cutter on the forward position thereof; to provide such an apparatus wherein the cutter comprises a sickle bar which is retained in a substantially level, horizontal orientation during the raising and lowering of the same with respect to the ground; to provide such an apparatus, wherein the frame has a quadrilateral shape and a power ram which raises and lowers the sickle bar; and to provide such an apparatus which is economical to manufacture, efficient in use, capable of a long operating life, and particularly well adapted for the proposed use.

Other objects and advantages of this invention will become apparent from the following description taken in conjunction with the accompanying drawings, wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific, structural and functional details disclosed herein are not to be interpreted as limiting, but merely as a basis for the claims and as a representative basis for teaching one skilled in the art to variously employ the present invention in virtually any appropriately detailed structure.

Figure 1:
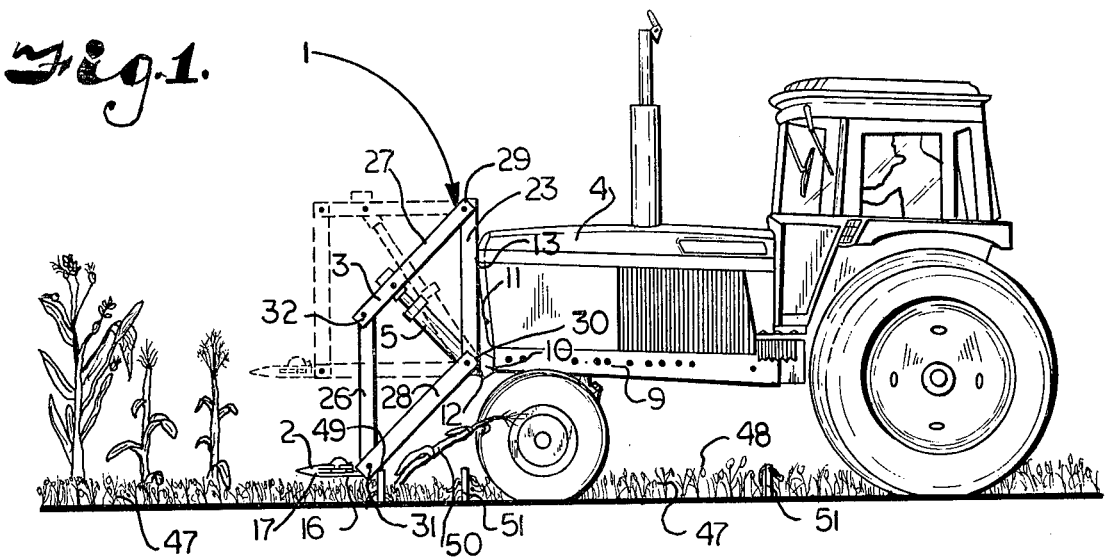
FIG. 1 is a side elevational view of an apparatus embodying the present invention, shown attached to an agricultural vehicle, and illustrating a method for controlling the growth of unwanted plants which project upwardly from a cultivated crop growing in a field.
Figure 2:
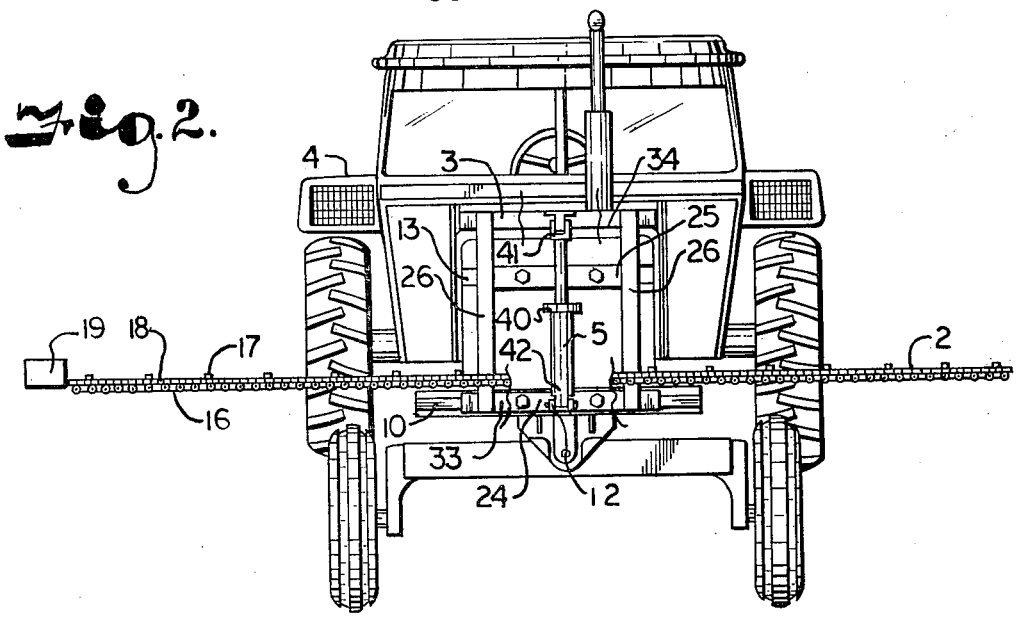
FIG. 2 is a front elevational view of the apparatus, shown attached to the agricultural vehicle, with proportions thereof broken away to reveal the interconnection therebetween.

For purposes of description herein, the terms "upper", "lower", "right", "left", "rear", "front", "vertical", "horizontal", and derivatives thereof shall relate to the invention as oriented in FIG. 1, however, it is to be understood that invention may assume various alternative orientations, except where expressly specified to the contrary.

The reference numeral 1 generally designates an apparatus embodying the present invention for controlling the growth of unwanted plants which project upwardly from a cultivated crop growing in a field. The apparatus comprises an elongate cutter 2 which is adapted for severing a portion of each of the upwardly projecting, unwanted plants from an associated root portion thereof. A frame member 3 is provided and includes a forward end thereof connected with and supporting the cutter 2, and a rearward end thereof adapted for connection with an agricultural vehicle 4. The frame 3 is articulated, and includes power means 5 selectively pivoting the forward portion of the frame with respect to the rearward portion, whereby the cutter 2 is raised and lowered with respect to ground.

The agricultural vehicle 4 is adapted to traverse the field in which the crop is growing, and is preferably self propelled or drawn by a self propelled vehicle. In the illustrated example, the agricultural vehicle 4 comprises a tractor having a pair of lower frame rails 9, and a transversely extending bumper or forward support 10, which is provided with anchor 12 means, such as threaded holes, to facilitate detachable connection of the apparatus frame 3 therewith. The forward end 11 of the tractor also includes a second frame anchor 13, which is spaced upwardly of the lower anchor to facilitate detachable connection of an upper portion of the apparatus frame 3 therewith. The lower and upper anchors 12 and 13 are preferably conventional portions of the tractor which are provided by the manufacturer thereof to mount a variety of different types of attachments to the front end of the tractor. Preferably, the agricultural vehicle 4 has a high ground clearance, such that the same may be driven through the field as the crop develops, without damaging the cultivated plants.

The cutter 2 may comprise any apparatus which is adapted to sever the unwanted plants, and in the illustrated example, comprises a sickle bar which is mounted to the forward end portion 11 of the frame in a manner whereby the same is retained in a substantially level, horizontal orientation during the raising and lowering of the sickle bar with respect to the ground. The sickle bar may comprise any conventional construction which is capable of cutting the contemplated unwanted vegetation, such as weeds, volunteer plants, and the like. In the illustrated example, the sickle bar comprises a stationary blade member 16 having a plurality of guide members 17 protruding outwardly thereof to guide the vegetation into the cutting portion of the sickle bar. A reciprocating blade member 18 is slidably connected with the stationary blade member 16 and is adapted to reciprocate with respect thereto so as to produce a scissors-like cutting action with the stationary blade. The reciprocating blade 18 may be powered by any suitable means, and in the illustrated structure, a hydraulic motor 19 is connected with the same through a cam mechanism to translate the reciprocating blade with respect to the stationary blade, thereby producing the cutting action. The sickle bar 2 is preferably quite long, in the nature of 15-20 feet, such that the upwardly projecting unwanted plants in several adjacent rows of the crop may be severed during a single pass of the apparatus. Because the sickle bar is mounted on the front of the vehicle, the unwanted plants are cut immediately prior to the transversal of the vehicle thereover.

Figure 3:
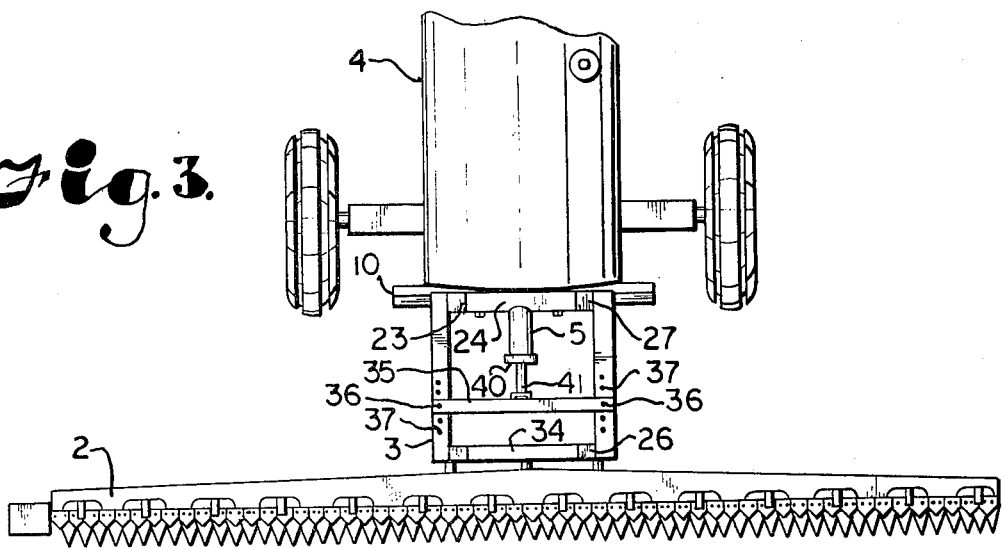
FIG. 3 is a top plan view of the apparatus, shown connected with the agricultural vehicle.

The articulated frame 3 is designed to raise and lower the cutter 2 between a ground level position and a height slightly above the tallest, fully developed cultivated plants for which the apparatus is used. Preferably, the frame is capable of raising the cutter to a height in the nature of 5 feet to facilitate use with fairly tall crops, and to enable the device to be easily transported through the fields. The illustrated frame 3 comprises a rearward pair of spaced apart, vertically oriented arms 23 which are adapted for rigid connection with the front end 11 of the tractor 4. In this example, lower and upper cross braces 24 and 25 extend between the arms 23, and are detachably connected with the lower and upper anchors 12 and 13 respectively of the tractor by suitable means such as threaded fasteners. A forward pair of spaced apart vertically oriented arms 26 are aligned with the rearward arms 23, and positioned forwardly thereof. The sickle bar 2 is mounted on the forward arms 26 and is supported thereby. A pair of upper and lower coupling arms 27 and 28 respectively have each end thereof pivotally connected with an associated one of the rearward and forward arms 23 and 26 respectively at a joint 29-32, thereby forming a boxlike or quadrilaterally shaped frame. Upper and lower transverse braces 33 and 34 respectively, are connected between the forward arms 26 to provide rigidity to the frame structure. As best illustrated in FIG. 3, frame 3 also includes an anchor brace 35 which extends transversely between the upper coupling arms 27 and is securely affixed thereto at a position slightly forward of the medial portion of the upper coupling arms. The anchor brace 35 is adapted for connection with an upper end of the power means 5, and is preferably adjustable on the frame to provide means for varying the lowest and highest position of the cutter 2. In this example, the brace 35 is attached to the top surface of the upper coupling arms 27 by threaded fasteners 36, and a plurality of aligned apertures 37 are provided for moving the brace closer or further away from the forward end of the frame.

A longitudinally extending ram 40 is connected with the apparatus frame 3 in a manner which permits the same to selectively rotate the upper and lower coupling arms 27 and 28 for raising and lower the sickle bar 2 with respect to the ground. The illustrated ram 48 comprises a hydraulic cylinder having the upper end 41 pivotally connected with a medial portion of the anchor brace 35. The lower end 42 of the ram 40 is pivotally connected with a stationary portion of the agricultural vehicle, such as the illustrated bumper member 10, whereby extension of the ram 40 elevates the sickle bar (as illustrated by the phantom lines in FIG. 1), and retraction of the ram lowers the sickle bar. The height of the sickle bar can be varied in infinitely small increments between its highest and lowest positions to accommodate a wide variety of uses. Further, by varying the anchor brace 35 toward and away from the front end of the frame, the entire elevational range of the sickle bar can be lowered and raised respectively. Means such as a photoelectric sensor (not shown) may be connected with the ram 40 for continuously and automatically adjusting the elevation of the sickle bar to cut the unwanted plants slightly above the uppermost portion of the surrounding crop. The box-like or quadrilateral shape of the apparatus frame 3 rigidly attaches the sickle bar to the tractor in a manner which resists torques applied to the sickle bar during operation, yet raises and lowers the sickle bar while maintaining the same in a substantially level, horizontal orientation so as to present the guide portion of the sickle bar to that vegetation which is to be cut. Because the frame 3 attaches to the sickle bar at two, spaced apart points, a fairly long sickle bar can be used without experiencing an unacceptable degree of bending or flexing in the bar.

A method embodying the present invention for controlling the growth of unwanted plants which project upwardly from a cultivated crop growing in a field includes providing an agricultural vehicle, such as the farm tractor 4, which is adapted to traverse the field in which the crop is growing. In the example illustrated in FIG. 1, the unwanted plants 46 are tall, stalky plants, in the nature of corn, milo, alfalfa, and the like, which project upwardly of a leafy, low profile crop 47, such as soybean, which grows fairly close to the ground. The cutter 2 is connected with the tractor 4 by the apparatus frame 3, and is positioned at an elevation with respect to the ground slightly above the uppermost portion 48 of the crop 47. The elevational range of the cutter may be varied by adjusting the anchor brace 35. The tractor 4 and the cutter 2 are traversed over the field, thereby cutting each of the upwardly projecting unwanted plants 46 at a point 47 thereon slightly above the uppermost portion 48 of the crop 47, so as to arrest the growth of the unwanted plants, and to facilitate the mechanical harvesting of the crop. The cutter 2 severs an upper portion 50 of the unwanted plant 46 from an associated root portion 51 thereof. As best illustrated in FIG. 1, the severed upper portions 50 of the unwanted plants are allowed to fall to the ground between adjacent rows of crop. The severed upper portion of the unwanted plant decomposes in the field, so as to avoid being harvested with the crop, and clogging or stalling the mechanical crop harvester. The severence of the upper portion of the unwanted portion kills or at least arrests the growth of the unwanted plant, thereby facilitating the growth of the cultivated crop and improving the mechanical harvesting thereof. Although the root portions of the severed plants are not killed, the lack of leaves and light to the same greatly retards further growth. If necessary, the above described method can be used on a crop more than once during the growing season, without encountering the adverse effects experienced by the repeated use of herbicides. The method is preferably performed simultaneously with other farming operations, such as cultivating, or the like, to insure an efficient use of time, equipment, and fuel.

It is to be understood that while I have illustrated and described certain forms of my invention, it is not to be limited to the specific forms or arrangement of parts herein described and shown, except insofar as such limitations are included in the following claims.

What is claimed and desired to secure by Letters Patent is:

1. An apparatus for controlling growth of unwanted plants which project upwardly of a cultivated crop growing in a field, said apparatus comprising:
    (a) elongate cutting means adapted for severing an upper portion of each of said upwardly projecting unwanted plants from an associated root portion thereof; and
    (b) a frame having a first portion thereof connected with and supporting said cutting means, and a second portion thereof adapted for connection with an agricultural vehicle; said frame including:
        (1) a rearward pair of spaced apart vertically oriented arms adapted for rigid connection with a front portion of the agricultural vehicle;
        (2) a forward pair of spaced apart vertically oriented arms, aligned with said rearward arms and positioned forwardly thereof; said cutting means being mounted on said forward arms and supported thereby;
        (3) a pair of upper and lower coupling arms having each end thereof pivotally connected with an associated one of the rearwrd and forward arms respectively thereby forming a quadrilaterally shaped frame;
        (4) a transverse bar positioned between said upper coupling arms spaced at a longitudinal distance from the associated rearward arms;
        (5) means selectively rotating said upper and lower coupling arms for raising and lowering said cutting means with respect to the ground; said coupling arm rotating means including a power ram having a first end thereof pivotally attached to said transverse bar so as to be connected to said upper coupling arms at a first connection point thereon spaced from the associated rearward arm and a second end thereof pivotally connected to a stationary portion of said agricultural vehicle at a second connection point that is situated below said first connection point whereby ram extension elevates said elongate cutting means and positions same at a selected height; said first connection point being variable thereby allowing for a greater control of height variation of said elongate cutting means while in use; and wherein
        (6) said quadrilaterally shaped frame comprises a parallelogram whereby said cutting means is retained in a substantially level, horizontal orientation during raising and lowering of the cutting means.

2. A method for controlling the growth of unwanted plants which project upwardly from a separate cultivated crop growing in a field; said crop being harvested by a first agricultural vehicle during a latter traverse of the field; said method comprising the steps of:
    (a) providing a second agricultural vehicle adapted to traverse the field in which said crop is growing, without substantial damage to said crop;
    (b) providing power cutting means connected with said second agricultural vehicle; said cutting means translating with said second agricultural vehicle, and being adapted for severing an upper portion of each of said upwardly projecting unwanted plants from an associated lower portion thereof;
    (c) positioning said cutting means at an elevation with respect to the ground in the field, slightly above an uppermost portion of the crop;
    (d) passing said second agricultural vehicle and said cut-means over the field during an earlier traverse of the field with respect to said latter traverse of the field; and
    (e) cutting each of said upwardly projecting unwanted plants at a point thereon slightly above the uppermost portion of said crop, thereby arresting the growth of said unwanted plants and facilitating the mechanical harvesting of said crop during said latter traverse.

3. The method according to claim 2 wherein:

(a) said earlier traverse is spaced from said latter traverse a sufficient time to allow said severed upper portions of said unwanted plants to decay before harvesting of said crop.

4. A method as set forth in claim 2 wherein:
(a) said unwanted plants comprise volunteer plants.

5. A method as set forth in claim 4 wherein:
(a) said crop comprises low profile plants.

6. A method as set forth in claim 2 including:
(a) permitting the severed, upper portion of said unwanted plants to fall to the ground between adjacent rows of said crop.

7. A method as set forth in claim 2 wherein:
(a) said unwanted plants are cut from the field immediately prior to the traversal of said first agricultural vehicle thereover.

* * * * *